United States Patent Office 3,117,109
Patented Jan. 7, 1964

3,117,109
REMOVAL OF IRON FROM A BUTADIENE-STYRENE LATEX BY THE USE OF AN ALKALI METAL HYDROXIDE
Manfred Glathe and Kurt Bär, Marl, Kreis Recklinghausen, Germany, assignors to Chemische Werke Huls Aktiengesellschaft, Marl, Kreis Recklinghausen, Germany, a corporation of Germany
No Drawing. Filed Apr. 24, 1961, Ser. No. 104,835
Claims priority, application Germany July 26, 1960
1 Claim. (Cl. 260—85.1)

Synthetic rubber generally is made in aqueous emulsion in the presence of redox activators which contain heavy metal salts and especially iron salts. As a result the synthetic latex and the synthetic rubber made therefrom by precipitation is more or less darkly colored. Even when the polymerization is carried out in the absence of heavy metals contamination of the latex during its production or later treatment with heavy metal ions frequently cannot be prevented and this impairs the color of the rubber obtained from the latex.

It has been found that the heavy metal content of synthetic rubber latex and the rubber made therefrom by precipitation can be reduced by adding a small amount of a strong base to the latex and separating the resulting precipitate of heavy metal compounds from the latex by a known method.

Potassium hydroxide and sodium hydroxide are suitable strong bases for use in the process. Ammonium hydroxide solution also may be used but the effect is significant only when a large amount is used. The known addition of a small amount of ammonia for stabilization of the latex does not cause any separation of heavy metal compounds. The amount of the addition of strong base depends upon the pH value of the latex. The amount generally is so measured that after the addition the pH value will be within the range from 10.5 to 13.5 and preferably within the range from 12 to 13. For this purpose it is necessary to use from .004 to 0.6 part by weight of potassium or sodium hydroxide per 100 parts of rubber or per 400 parts of a 25% latex. By the addition of the alkali metal hydroxide the heavy metal compound derived from the polymerization ingredients or subsequently introduced is aggregated and converted into a relatively coarse disperse form which is easily separable from the latex which remains colloidally stable. Upon standing the resulting latex separates into two or more phases one of which contains the heavy metal compound. By centrifuging or ultrasonic treatment or the action of a magnetic field the separation of the heavy metal compound can be accelerated. By the usual precipitation and drying methods a light colored synthetic rubber can be made from the purified latex having a heavy metal content of less than 25 mg./kg. of rubber whereas synthetic rubber made from a similar but untreated latex has a heavy metal content of 250 to 300 mg./kg. of rubber.

Example 10,000 parts by weight of a synthetic latex adjusted to a pH value of from 9.3 to 9.7, said latex having been prepared from 70 parts by weight of butadiene, 30 parts by weight of styrene, 180 parts by weight of water, 5 parts by weight of "Dresinate 731" (100%), 0.15 part by weight of iron sulfate, 0.2 part by weight of potassium pyrophosphate, 0.12 part by weight of cumene hydroperoxide and 0.15 part by weight of dodecyl mercaptan, are mixed with stirring with 100 parts by weight of a 5% solution of potassium hydroxide. The pH value of the resulting mixture is about 12.7. After from 2 to 4 hours standing a brown colored sediment forms. The supernatant latex appears pure white. This white latex is introduced into three times its volume of a precipitating solution consisting for example of 9 parts by weight of methanol, 0.5 part by weight of 30% sodium chloride solution, 0.3% acetic acid and 0.5 part by weight of distilled water. The so-precipitated rubber is dried in a drier with air circulation. Its iron content is 27 mg./kg. of rubber.

"Dresinate 731" referred to in the foregoing example is the trade name of an emulsifier consisting essentially of the alkali metal salts of disproportionated resin acids.

We claim:
Process for the production of synthetic rubber latex having a low iron content which consists of the steps of (1) adding 0.004 to 0.6 part by weight of an alkali metal hydroxide per 100 parts of butadiene-styrene rubbery copolymer to (2) a butadiene-styrene latex which has a pH of 9.3 to 9.7 and which was prepared (3) in the presence of iron sulfate (4) thus raising the pH in the range of 10.5–13.5 whereby (5) an iron compound is precipitated out; (6) separating the latex from the iron compound and (7) recovering a butadiene-styrene rubber containing less than 25 mg. of iron per kg. of rubber.

References Cited in the file of this patent
UNITED STATES PATENTS

| | | |
|---|---|---|
| 2,446,107 | Rumbold | July 27, 1948 |
| 2,456,069 | Livingston | Dec. 14, 1948 |
| 2,469,827 | Johnson | May 10, 1949 |
| 2,908,668 | Reynolds et al. | Oct. 13, 1959 |

OTHER REFERENCES

Synthetic Rubber by Whitby, John Wiley & Sons, Inc., 1954, page 802. (Copy in Sci. Lib.)